F. M. FICHTEN.
TRACTION LUG.
APPLICATION FILED OCT. 8, 1921.
1,416,806.
Patented May 23, 1922.
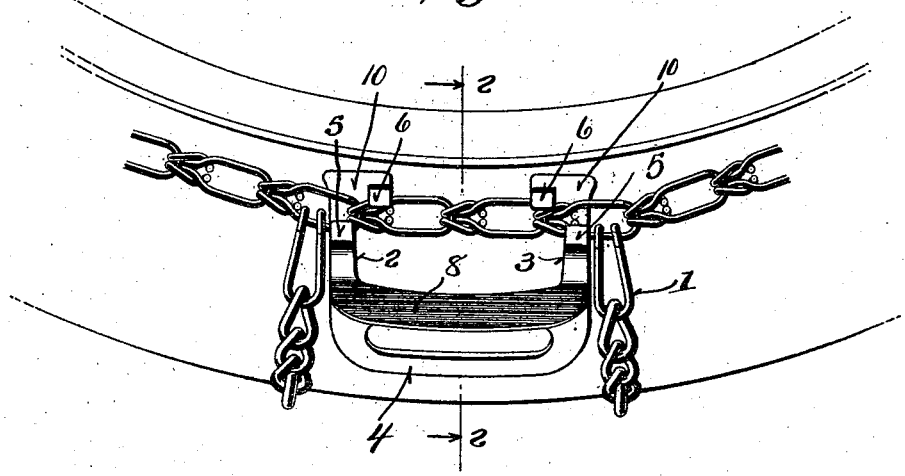
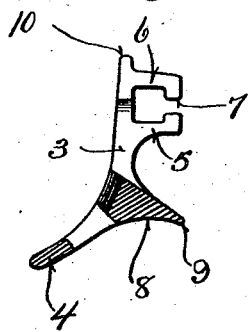
Witness:
Robert E. Weber
Inventor:
Frank M. Fichten
By Young & Young
Attorneys

UNITED STATES PATENT OFFICE.

FRANK M. FICHTEN, OF MANITOWOC, WISCONSIN.

TRACTION LUG.

1,416,806.   Specification of Letters Patent.   Patented May 23, 1922.

Application filed October 8, 1921.   Serial No. 506,377.

*To all whom it may concern:*

Be it known that I, FRANK M. FICHTEN, a citizen of the United States, and resident of Manitowoc, in the county of Manitowoc and State of Wisconsin, have invented certain new and useful Improvements in Traction Lugs; and I do hereby declare that the following is a full, clear, and exact description thereof.

My invention relates to a new and improved traction lug which is adapted to be used in connection with any one of the various makes of anti-skid chains which are now on the market.

The general object of the invention is to provide a device of this kind which may be manufactured separately and readily applied to the chain by the consumer.

A more specific object of the invention is to provide a device of this kind which, when used on an anti-skid chain, will effectively prevent the tire from sinking into the ground.

A further object of the invention is to provide the device with means which will dig into the ground whenever a vehicle has a tendency to skid sidewise, and thus prevent excessive skidding.

In order that my invention may be more fully understood, reference will be had to the accompanying drawing in which, Figure 1 is a side elevational view of a portion of a tire and anti-skid chain with my invention applied thereto, and Figure 2 is a detail sectional view on the line 2—2 of Figure 1.

In the drawing, the numeral 1 designates an anti-skid chain which may be of any usual type. The lug which comprises my invention is formed of a pair of arms 2 and 3, which are connected at one end by a web 4. A pair of jaws 5 and 6 is formed on the outer end of each arm, and the outer jaws 6 are offset laterally of the jaws 5 and towards each other. Thus when the chain is drawn taut, the jaws will firmly grip the same and secure the lug in its position thereon.

Ordinarily it is intended to manufacture the lugs separately and they may be easily applied by the purchaser.

The jaws may be applied by swaging or the like, so as to be effectively held on the chain against accidental removal. The ends of the jaws are also preferably provided with lips 7, whereby to secure a better hold upon the chain. A flange 8 extends between the arms 2 and 3 above the web 4. This flange has a relatively broad surface so that in soft ground where the tire has a tendency to sink in, this broad surface or shelf will engage the surface of the ground so as to form an abutment to prevent the tire from sinking in too far.

The flange is also provided with a relatively sharp edge or spur 9. When the vehicle has a tendency to skid sidewise, the tire will naturally be tilted somewhat laterally so that the spur 9 will engage the surface of the ground and check the skidding movement.

A flange 10 is also preferably provided on each arm, which extends beyond the jaws and rests snugly against the surface of the tire so as to prevent the lug from becoming accidentally misplaced or swinging outwardly.

I claim:

1. A traction lug having two arms connected by a web at one end and having jaws at the other end adapted to be secured to the longitudinally extending portion of an anti-skid chain, the inner sides of the arms being curved to conform to the side of a tire and an elongated spur connecting the arms above their web portion and extending outwardly.

2. A tractor lug having two arms connected by a web at one end and each arm having a pair of jaws at its other end adapted to be secured to the longitudinally extending portion of an anti-skid chain, the outer jaws of the pairs being offset toward each other so as to grip the chain more firmly as the latter becomes taut, the inner sides of the arms being curved to conform to the side of a tire and an elongated spur connecting the arms above their web portion and extending outwardly.

3. A tractor lug having two arms connected by a web at one end and having jaws at the other end adapted to engage the longitudinally extending portion of an antiskid chain, the arms having curved faces on one side to fit the curved side of a tire, a comparatively thin flat flange connecting the arms above the web and extending perpendicularly from the side opposite from the tire, whereby to form an abutment to hold the tire from sinking into the ground and a spur to prevent lateral slipping.

In testimony that I claim the foregoing I have hereunto set my hand at Milwaukee, in the county of Milwaukee and State of Wisconsin.

FRANK M. FICHTEN.